United States Patent
Koenig

(10) Patent No.: US 7,805,208 B2
(45) Date of Patent: Sep. 28, 2010

(54) SYSTEM FOR POSITIONING A CONTROL ELEMENT

(75) Inventor: Guido Koenig, Hanau (DE)

(73) Assignee: Samson Aktiengesellschaft, Frankfurt (DE)

( * ) Notice: Subject to any disclaimer, the term of this patent is extended or adjusted under 35 U.S.C. 154(b) by 467 days.

(21) Appl. No.: 11/874,240

(22) Filed: Oct. 18, 2007

(65) Prior Publication Data

US 2008/0097652 A1    Apr. 24, 2008

(30) Foreign Application Priority Data

Oct. 20, 2006    (DE) ........................ 10 2006 049 650

(51) Int. Cl.
     *G06F 19/00*    (2006.01)
(52) U.S. Cl. ............................. 700/56; 700/62; 700/282
(58) Field of Classification Search .................. 700/282, 700/56, 62
See application file for complete search history.

(56) References Cited

U.S. PATENT DOCUMENTS

| | | | | |
|---|---|---|---|---|
| 4,577,280 A | * | 3/1986 | Putman | ...................... 700/282 |
| 6,400,994 B1 | * | 6/2002 | Gerk | ........................... 700/66 |
| 7,178,783 B2 | * | 2/2007 | Tuin et al. | .............. 251/129.04 |
| 7,584,643 B2 | * | 9/2009 | Hoffman | ..................... 73/1.72 |
| 2006/0118745 A1 | * | 6/2006 | Tuin et al. | .............. 251/129.04 |
| 2006/0191314 A1 | * | 8/2006 | Karte | ......................... 73/1.72 |

FOREIGN PATENT DOCUMENTS

| | | |
|---|---|---|
| DE | 19921828 A1 * | 11/2000 |
| WO | WO 2005/093532 | 10/2005 |
| WO | WO 2005093532 A1 * | 10/2005 |

* cited by examiner

*Primary Examiner*—Michael D Masinick
(74) *Attorney, Agent, or Firm*—Schiff Hardin LLP

(57) ABSTRACT

A system is provided for positioning a control element. The control unit positions the control element. A limit signal transmitter monitors achievement of an expected position of the control element. The control unit and the limit signal transmitter are each electrically powered separately from each other. A sensor for sensing a position of the control element is connected to both the control unit and the limit signal transmitter such that at least one position signal of the sensor is received by the limit signal transmitter and the control unit.

23 Claims, 1 Drawing Sheet

SYSTEM FOR POSITIONING A CONTROL ELEMENT

BACKGROUND

The preferred embodiment relates to a system for positioning a control element, particularly a pneumatically operated final control valve such as a fast-shutoff valve. Such final control valves are preferably operated via a pneumatic pivoting actuator. In normal operation of a process engineering plant such as a petrochemical plant in which final control valves are integrated, the pneumatic pivoting actuator furnishes compressed air for positioning the final control valve in various opening positions, preferably in maintaining it fully open. In an emergency situation—for example, on a power outage of the process engineering plant—the pneumatic pivoting actuator is activated such that the compressed air is dumped which releases a spring integrated in the pneumatic pivoting actuator, resulting in the final control valve being fully closed.

It is known to provide such pneumatic control element systems with a positioner or position controller. A controller microcomputer thereof generates from a desired/actual value comparison a signal for positioning the control element as desired. Particularly safe operating positioning systems for pneumatically operated control elements can be defined such that in addition to the positioner an automatic limit signal transmitter or limit stop switch is provided which is mainly required to monitor whether a desired position, particularly a final position of the final control valve, has actually been attained.

Such a positioning system is known for example from WO2005/093532 A1 in which both a positioner and a limit signal transmitter are provided. The limit signal transmitter communicates via a conductor with the positioner in which an insulating unit is integrated. The limit signal transmitter has its own power supply and is provided with its own microcomputer and a position sensor to ensure reliably safe functioning. One disadvantage in this known positioning system is that the overall configuration of the limit signal transmitter and positioner is extremely complex and involves high investment costs.

SUMMARY

It is an object to provide a positioning system for a control element, particularly a pneumatically operated final control valve, such as a fast-shutoff valve, while maintaining safe functioning by a cost-effective, simple configuration.

A system is provided for positioning a control element. The control unit positions the control element. A limit signal transmitter monitors achievement of an expected position of the control element. The control unit and the limit signal transmitter are each electrically powered separately from each other. A sensor for sensing a position of the control element is connected to both the control unit and the limit signal transmitter such that at least one position signal of the sensor is received by the limit signal transmitter and the control unit.

DESCRIPTION OF THE PREFERRED EMBODIMENT

Figure 1:
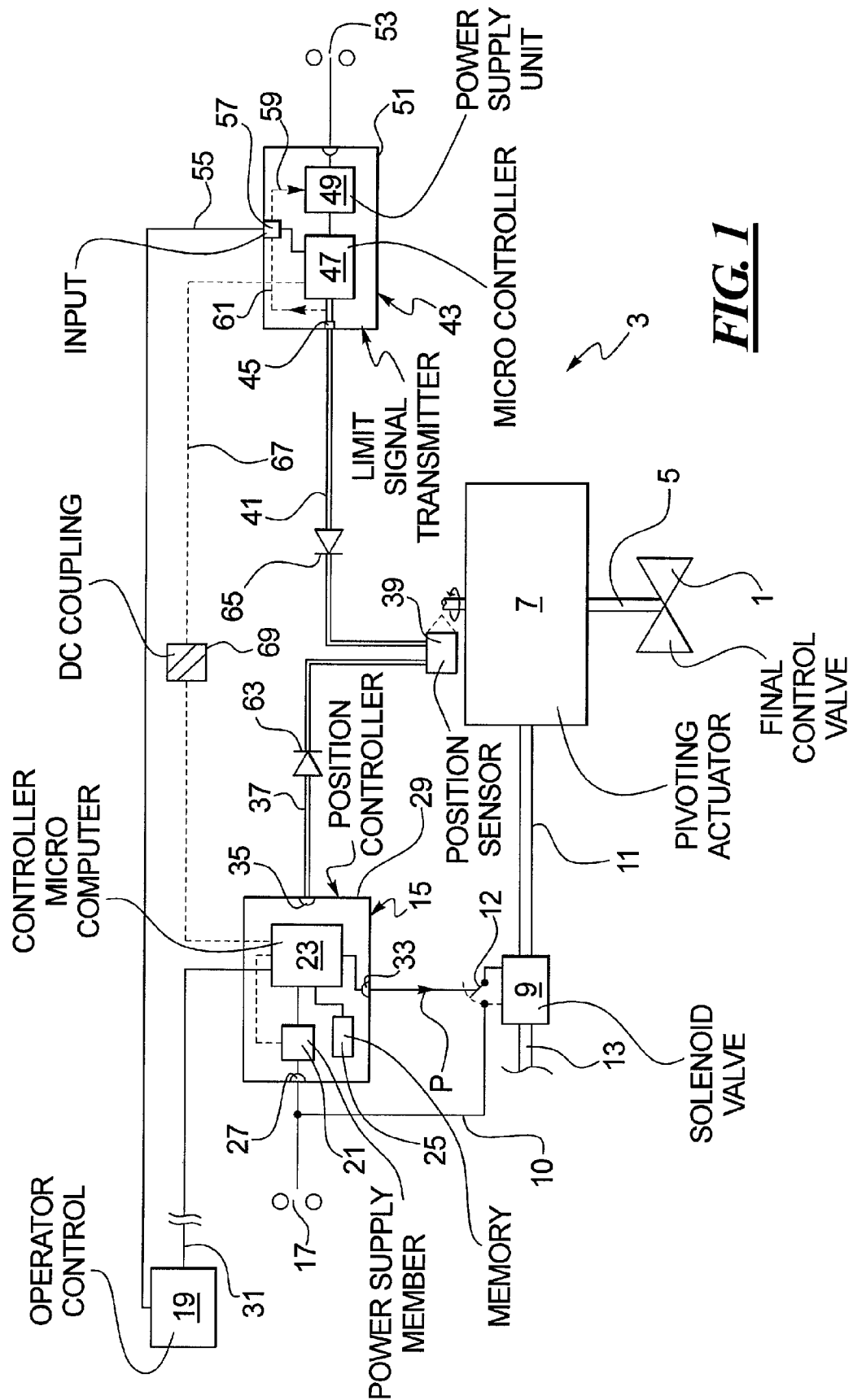
FIG. 1 is a block diagram of a system for positioning a closed-loop controlled final control valve.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

It is intended that the total positioning system comprises two independent units namely a control unit and signal transmitter switch, and which is based on just a single position sensor. It has been surprisingly discovered that when providing just a single position sensor for the positioner and limit signal transmitter necessarily working independently of each other, the desired operational safety can be assured without having to accept a detrimental precise positioning of the control element and precise monitoring, particularly of emergency final positions, through the limit signal transmitter.

So that the sensor also generates positioning signals and sends them to a corresponding electronic unit, namely the control unit and/or limit signal transmitter, the sensor is powered both by the control unit and by the limit signal transmitter. To achieve this, in one embodiment, both the control unit and the limit signal transmitter each have their own electric power supply. The control unit and the limit signal transmitter can power the sensor each independently of the other, particularly non-regenerative to each other electronic unit. Now, when the control unit or the limit signal transmitter or at least the corresponding power supply is down, the other electronic unit in each case is able to power the sensor for position sensing.

In one preferred embodiment, the power supply for a positioner or position controller comprises a supply voltage of 7 to 8 volts, particularly with an amperage of less than approximately 1 mA or more than approximately 2 mA and/or an amperage supply of 4 to 20 mA. By picking a voltage signal, particularly a 24 volt signal, the power supply of the limit switch can be configured for a solenoid valve of a pneumatic actuator which vents the air power to close the final control element particularly when the 24 volt signal is down. In addition or as an alternative thereto the limit signal transmitter can be provided with a supply voltage of 7 to 8 volts, and particularly with an amperage of less than approximately 1 mA or more than approximately 2 mA.

In one further embodiment both the limit signal transmitter and the positioner have an AC/DC converter for generating a constant supply voltage for the controller microcomputer and the limit signal transmitter microcomputer.

In a preferred further embodiment at least one line connecting the control to the sensor is configured non-regenerative, preferably also a line connecting the limit signal transmitter to the sensor is configured non-regenerative. This ensures that despite a parallel power supply for the sensor by two power sources namely, on the one hand, by the limit signal transmitter and, on the other, by the control unit, no unwanted power supply to the other electronic unit in each case is involved. It is particularly in an emergency in which a positioner configured as the control unit is to be deactivated so that, for example, a solenoid valve dumps the pneumatic actuator, so that energizing the deactivated positioner and thus the solenoid valve would be highly critical to safety. The desired non-regenerative connection can be achieved, for example, in that a diode is inserted in the line directly connecting the positioner, particularly the controller microcomputer, and the sensor blocks a power flow from the sensor to the position sensor but always allows a flow in the opposite direction. In addition a further diode, especially of the same type as the other, can be inserted in the line directly connecting the limit signal transmitter, particularly the limit signal transmitter microcomputer and the sensor.

In an aspect of the preferred embodiment, the line connecting the sensor and the control unit or the limit signal transmitter is configured as an electrically conducting wire pair via which by way of a two-wire technique (N+N technique) both power for the sensor and communicating signals from the sensor can be conducted.

In another aspect of the preferred embodiment there is provided between the controller microcomputer and a limit signal transmitter microcomputer a direct, particularly non-regenerative communicating line with which the other smart electronic unit in each case can be adjusted. To prevent each power supply of the electronic units of the positioner and of the limit signal transmitter influencing the other, the communicating line is DC decoupled.

The sensor assigned to both the control unit, i.e. the positioner, and the limit signal transmitter is designed to continually send positioning signals or final position signals to the loop control unit and the limit signal transmitter. For this purpose, the sensor can either comprise two separate outputs connected to the corresponding electronic unit of the control unit or of the limit signal transmitter, or a single output forming a connection for both the positioner and for the limit signal transmitter.

In one aspect of the preferred embodiment, the system is engineered without a microcomputer native to the limit signal transmitter, the limit signal transmitter having no microcomputer of its own, but however, is designed to access the microcomputer of the positioner. Preferably the access line needed for this purpose is likewise configured non-regenerative.

As an alternative, the limit switch can be engineered with a limit signal transmitter microcomputer for communicating with the control unit microcomputer via an especially non-regenerative interface line.

Referring to FIG. 1, there is illustrated a system 3 for positioning a final control valve 1. The final control valve 1 is actuated via a positioning shaft 5 by a pneumatic pivoting actuator 7 controlled by a solenoid valve 9. The pneumatic pivoting actuator 7 is connected to the solenoid valve 9 via a conduit 11, the solenoid valve 9 being ported to a source of compressed air (not shown) via an input tube 13.

The solenoid valve 9 receives positioning signals P from a positioner or position controller 15 powered by an electric power supply. Together, the solenoid valve 9 and positioner/controller 15 can form the control unit which, as an alternative is achievable simply by the solenoid valve 9. The electric power supply can be provided by a supply voltage 17 as may be defined by 7 to 8 volts with an amperage of less than 1 mA or more than 2 mA or 4 to 20 mA, and/or by an external operator control 19. The supply voltage 17 also serves to supply the solenoid valve 9 via the voltage signal supply line 10 with a voltage signal of 7 to 8 volts. Inserted in the voltage signal supply line 10 is a relay 12 which can be opened and closed. Activating the relay 12 with the positioning signal opens the relay 12 as shown in FIG. 1 and the solenoid valve 9 is deactivated so that the pneumatic pivoting actuator 7 is dumped for failsafe operation of the final control valve 1.

The position/controller 15 comprises as its electronic components: an electrical power supply unit or member 21, a controller microcomputer 23 and a volatile or non-volatile memory 25. Electrically the supply unit 21 is connected to the supply voltage 17 via an input terminal 27 of the housing 29 of the position/controller 15. The supply unit 21 can be additionally connected to an interface line 31 (indicated within the position/controller 15 by the broken line between the supply unit 21 and the interface line 31) so that the position/controller 15 comprises two power supplies, each working independently of the other.

The position/controller 15 comprises an output terminal 33 for transferring the positioning signal to the solenoid valve 9. The position/controller 15 features at its housing 29 a dual terminal 35 connecting a wire pair 37 to connect the position/controller 15 to a position sensor 39.

The position sensor 39 continually generates position signals indicating a position of the positioner shaft 5 of the pneumatic pivoting actuator 7 and relays the continual position signals via the twisted pair 37 to the controller microcomputer 23 of the position/controller 15.

In addition to communicating the position signals of the position sensor 39 the twisted pair 37 also ensures the electric power supply for the position sensor 39.

A second wire pair 41 is likewise connected to the position sensor 39 in providing a direct connection to a limit signal transmitter 43. The limit signal transmitter 43 comprises a dual terminal 45 connecting the wire pair 41 coming from the position sensor 39. The position sensor 39 is distally connected to the position/controller 15 and the limit signal transmitter 43 adjoining the positioning shaft 5.

Accommodated in a housing 51 of the limit signal transmitter are a limit signal transmitter microcontroller 47 and a further electrical power supply unit 49. The limit signal transmitter microcontroller 47 is in direct contact with the dual terminal 45. The supply unit 49 is powered by a first power source 53 defined by a supply voltage of 7 volts and an amperage of less than 1 mA and more than 2 mA and/or by a power supply provided by the external operator control 19 via an interface line 55. The connection from an input 57 connecting the interface line 55 to the supply unit 49 is indicated by a broken line identified by the reference numeral 59. The limit signal transmitter 43 can thus be activated by the two separate power supplies.

The limit signal transmitter microcontroller 47 too, receives via the wire pair 41 a position signal from the position sensor 39, i.e. signals for a final position of the final control valve 1 in critical situations such as in an emergency. The position sensor 39 is also electrically powered via the wire pair 41.

If the limit signal transmitter 43 is not required in sophisticated fashion by smart electronic components, such as the limit signal transmitter microcontroller 47, the limit signal transmitter 43 can be engineered with a bypass line 61 for directly relaying the final position signal of the position sensor 39 to the input 57 of the limit signal transmitter 43.

The limit signal transmitter microcontroller 47 is connected to the input 57 to receive from the external operator control 19 the data defining the desired final position of the final control valve 1.

Both line power supplies 49 and 21 of the limit switch 43 as well as of the external operator control 19 are engineered to provide a constant supply voltage to the corresponding microcomputers (23, 47) and thus also to the position sensor 39.

To safely exclude the electronic units 15, 43 influencing each other, the wire pairs 37, 41 each features a diode 63, 65 preventing regeneration from the sensor to the position/controller 15 and respectively to the limit signal transmitter 43 from the position sensor 39.

For calibrating and tweaking the other electrical component in each case, i.e. position/controller 15 and limit signal transmitter 43, respectively, a communicating line 67 is provided for directly connecting the controller microcomputer 23 to the limit signal transmitter microcontroller 47. Likewise to prevent regeneration the communicating line 67 is DC decoupled at DC coupling 69.

The positioning system 3 in accordance with the preferred embodiment for the final control valve 1 comprises two smart electronic units, each independent of the other, namely the position/controller 15 and the limit signal transmitter 43 engineered in accordance with the preferred embodiment to access just a single position sensor 39 in assuring all safety aspects for operating a process engineering plant, such as a petrochemical plant, nuclear power plant, or the like.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative ort additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without department from the spirit and scope of the present invention.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A system for positioning a control element, comprising:
   a control unit for positioning the control element;
   a limit signal transmitter for monitoring achievement of an expected position of the control element;
   the control unit and the limit signal transmitter each being electrically powered separately from the other;
   a sensor for sensing a position of the control element connected to both said control unit and said limit signal transmitter such that at least one position signal of the sensor is received by the limit signal transmitter and the control unit; and
   the control unit and the limit signal transmitter each having their own electric power supply, the control unit and the limit signal transmitter each being designed to power the sensor each independently of the other.

2. A system of claim 1 wherein said control element comprises a pneumatically operated control valve in a process plant.

3. A system of claim 2 wherein said control valve comprises a shut off valve.

4. A system of claim 1 wherein said control unit comprises a controller microcomputer for generating at least one positioning signal.

5. A system of claim 1 wherein said control unit comprises a solenoid valve.

6. A system of claim 1 wherein said control unit comprises a position controller.

7. A system of claim 1 wherein said limit signal transmitter comprises a microcomputer for said monitoring of said achievement of said expected position.

8. A system of claim 7 wherein said expected position comprises an end position.

9. A system of claim 1 wherein the power supply for the control unit comprises a supply voltage of 7 to 8 volts.

10. A system of claim 9 wherein the power supply provides the supply voltage with an average of less than approximately 1 mA or more than approximately 2 mA.

11. A system of claim 9 wherein the power supply provides the supply voltage with an average of 4 to 20 mA.

12. A system of claim 1 wherein the power supply of the limit signal transmitter is formed by picking off a voltage signal for a solenoid valve of a pneumatic actuator which vents when the voltage signal is down so as to move the control element into a safety position.

13. A system of claim 1 wherein at least one line connecting the control unit to the sensor and a line connecting the limit signal transmitter to the sensor are configured non-regeneratively without an electrical back coupling.

14. A system of claim 6 wherein both the limit transmitter and the position controller have a power supply for generating a constant supply voltage for a microcomputer of the control unit and a microcomputer of the limit signal transmitter.

15. A system of claims 1 wherein a diode is inserted in a line connecting a position controller of the control unit to the sensor and which blocks a power flow from the sensor to the position controller and also a diode is inserted in a line connecting the limit signal transmitter to the sensor to block a power flow from the sensor to the limit signal transmitter.

16. A system of claim 15 wherein both of the connecting lines are configured as an electrically conducting wire pair via which by way of a dual conductor system both power and communicating signals for the sensor are conducted.

17. A system of claim 1 wherein between a microcomputer of the control unit and a microcomputer of the limit signal transmitter is a direct non-regenerative communicating line.

18. A system of claim 17 wherein the communicating line is DC decoupled.

19. A system of claim 6 wherein the sensor is designed to continually send positioning signals to the position controller and end position signals to the limit signal transmitter.

20. A system of claim 1 wherein without its own microcomputer the limit signal transmitter accesses a microcomputer of a position controller of the control unit.

21. A system of claim 1 wherein the limit signal transmitter is provided with a limit transmitter microcomputer for communicating with a microcomputer of a position controller of the control unit via a non-regenerative interface line.

22. A system for positioning a control element, comprising:
    said control element comprising a pneumatically operated control valve functioning as a shutoff valve in a process plant;
    a control unit comprising a solenoid valve and a position controller including a controller microcomputer for generating at least one positioning signal for positioning the control element with said solenoid valve;
    a limit signal transmitter with a microcomputer for monitoring achievement of an expected position of the control element;
    the control unit and the limit signal transmitter each being electrically powered separately from the other;
    a sensor for sensing a position of the control element connected to both said control unit and said limit signal transmitter such that at least one position signal of the sensor is received by the limit signal transmitter and the control unit; and
    the control unit and the limit signal transmitter each having their own electric power supply, the control unit and the limit signal transmitter each being designed to power the sensor each independently of the other.

23. A system for positioning a control element, comprising:
    said control element comprising a pneumatically operated control valve functioning as a shutoff valve in a process plant;
    a control unit comprising a solenoid valve for positioning the control element;
    a limit signal transmitter with a microcomputer for monitoring achievement of an expected position of the control element;
    the control unit and the limit signal transmitter each being electrically powered separately from the other;
    a sensor for sensing a position of the control element connected to both said control unit and said limit signal transmitter such that at least one position signal of the sensor is received by the limit signal transmitter and the control unit; and
    the control unit and the limit signal transmitter each having their own electric power supply, the control unit and the limit signal transmitter each being designed to power the sensor each independently of the other.

* * * * *